Feb. 5, 1952     N. E. HART ET AL     2,584,873
BEARING RETAINING MEANS
Filed June 25, 1947
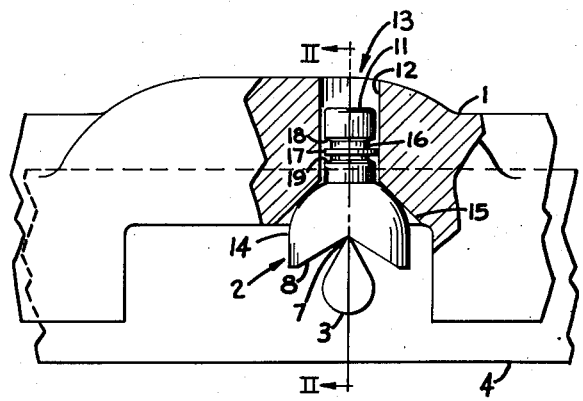
Fig. I
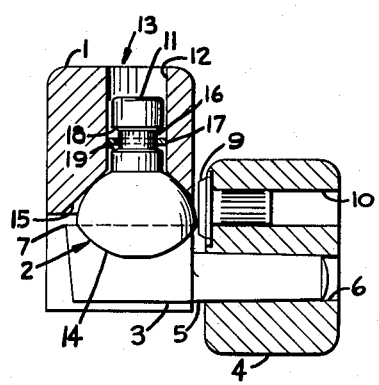
Fig. II
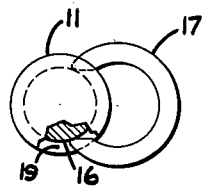
Fig. III
Fig. IV
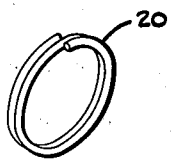
Fig. VII
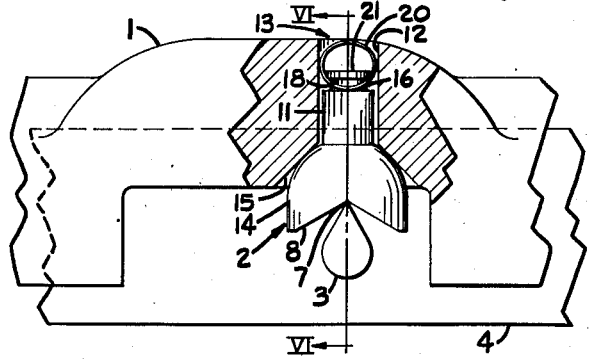
Fig. V
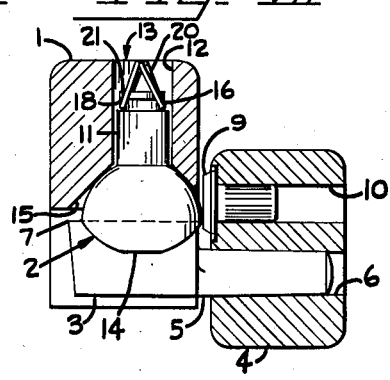
Fig. VI
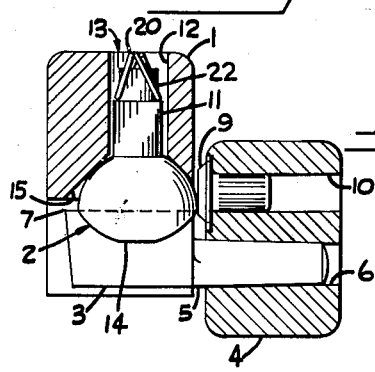
Fig. VIII
INVENTORS.
Norman E. Hart
William A. Guss
BY Marshall and Marshall
ATTORNEYS Patented Feb. 5, 1952

2,584,873

UNITED STATES PATENT OFFICE 2,584,873

BEARING RETAINING MEANS

Norman E. Hart and William A. Guss, Toledo, Ohio, assignors to Toledo Scale Company, Toledo, Ohio, a corporation of New Jersey Application June 25, 1947, Serial No. 756,880

3 Claims. (Cl. 308—2)

This invention relates generally to connecting means for force-transmitting members and more particularly to a retaining means for the bearing in a pivot and bearing connection for force-transmitting members.

In the construction of a weighing scale, for example, it is necessary to transmit force from the weight-receiving portion of the scale to the force-resisting members of the scale. The use of knife edge pivots and V-grooved bearings in the weighing scale art is well known, and this type of pivot and bearing has been found to be most satisfactory for affording a friction-free pivotal mounting. In time, however, even the slight amount of friction existing between the knife edge of the pivot and the bottom of the V-groove, coupled with shocks and jolts given to the scale, may dull the edge of the pivot and spoil the groove in the bearing. This is particularly true of a pivot and bearing which supports a load receiver on which packages may be dropped or which may be jolted or shocked in other ways. Occasionally during the life of the scale, therefore, it is necessary to replace both the pivot and the bearing so that the accuracy of the scale will not be destroyed because of the greatly increased friction resulting from the mutilated knife edge and V-groove.

The manufacture of knife edge pivots and V-grooved bearings is a rather expensive operation because the steel, or other material, from which both the pivots and bearings are fabricated must be very hard, which makes it expensive both as to material and machining.

Moreover, since a V-groove bearing is mounted above the knife edge pivot in many cases (e. g. the V-grooved bearing mounted on the load receiver spider above the knife edge pivot mounted on the main lever), it is necessary to employ some means of retaining the bearing in its socket especially during assembly. At the present time, a bearing is used which consists of a V-grooved hemispherical head and a shank, and the bearing is retained in its socket by means of a cotter key connected through a hole drilled in the shank.

The use of a cotter key furnishes a direct connection between the shank and the socketed member (e. g. the spider) which does not allow complete freedom of motion to the bearing and therefore in the manufacture of V-grooved bearings the hole must be carefully drilled in the shank and care must be used in the assembly of the pivot and bearing so that the V-groove of the bearing may be properly aligned with the knife edge pivot. Also the motion of the V-grooved bearing is so restricted that the proper alignment between the knife edge and bearing may not be maintained throughout the entire movement of the member in which the bearing is retained (i. e. the knife edge may be compelled to "ride" up onto the sides of the V-groove, instead of remaining at the bottom of the V-groove). Whenever force is transmitted through an improperly aligned knife edge and V-grooved bearing, not only is the friction greatly increased but also the useful life of the bearing and pivot is greatly decreased through wear and tear.

It is an object of this invention to provide an improved V-grooved bearing retaining means which allows freedom of motion of the V-grooved bearing as it coacts with the knife edge.

It is another object of this invention to provide a V-grooved bearing retaining means which allows the V-grooved bearing to automatically align itself with the knife edge.

It is a further object of this invention to provide a V-grooved bearing retaining means which allows the bearing and pivot connection to be easily and economically assembled.

More specific objects and advantages are apparent from the description in which reference is had to the accompanying drawing illustrating preferred embodiments of the invention, wherein similar reference numerals designate similar parts throughout the several views.

In the drawings:

Figure I is a vertical fragmentary view, partly in section, of a weighing scale pivot and bearing illustrating one modification of a bearing retaining means embodying the invention.

Figure II is a vertical sectional view substantially along the line II—II of Figure I.

Figure III is an enlarged detail plan view, partly in section, illustrating how the bearing retaining means shown in Figures I and II is assembled.

Figure IV is an enlarged isometric view of the bearing retaining means shown in Figure III.

Figure V is a view similar to Figure I showing another modification of a bearing retaining means embodying the invention.

Figure VI is a vertical sectional view substantially along the line VI—VI of Figure V.

Figure VII is an enlarged isometric view of the bearing retaining means shown in Figures V and VI.

Figure VIII is a fragmentary sectional view illustrating a modified bearing construction for use with the bearing retaining means shown in Figure VII.

These specific drawings and the specific description that follows merely disclose and illustrate the invention and are not intended to impose limitations upon the claims.

Referring to the drawings in detail, in Figures I and II, a load receiver spider 1 is mounted by means of a bearing 2, on a load pivot 3 of a lever 4, which is connected to a load counterbalancing mechanism (not shown). The pivot 3 has a tenon 5, which is rigidly held in a tapered hole 6 of the lever 4 and a knife edge 7 which rests in a V-groove 8 of the bearing 2 to pivotally receive the downward thrust of the spider 1 through the bearing 2. A thrust button 9 mounted in a hole 10 of the lever 4 receives the horizontal thrust (in the direction toward the lever 4) of the spider 1 through the bearing 2.

The bearing 2 has a shank 11 which extending upwardly is a loose fit in a cylindrical portion 12 of a socket 13 in the spider 1, and a hemispherically-shaped head 14 which rests in a cone-shaped shoulder portion 15 of the socket 13. The cone-shaped shoulder portion 15 of the socket 13 also may be hemispherically-shaped to conform to the hemispherical shape of the head 14 of the bearing 2. The shank 11 of the bearing 2 has an annular recess 16 which retains a C-clip 17, the gap of which is sufficient to clear the shank 11 at the annular recess 16 (see Figures III and IV). The C-clip 17 is a portion of a thin resilient metallic annulus, the outer dimension of which is an interference fit with the interior of the cylindrical portion 12 of the socket 13, the inner diameter of which is smaller than the diameter of the shank 11 and larger than the diameter of the portion of the shank 11 at the annular recess 16, and the thickness of which is substantially less than the breadth of the annular recess 16. Therefore, when the C-clip 17 is assembled on the shank 11 and thrust into the socket 13 frictional force created by its own resiliency holds it in the cylindrical portion 12 of the socket 13, the vertical motion of the bearing 2 being restricted by the engagement of the clip 17 with an upper shoulder 18 and a lower shoulder 19 of the annular recess 16.

This method of retaining the bearing 2 permits it to be self-aligning as it can rock and swivel freely in the cone-shaped shoulder portion 15 of the socket 13 to assure a perfect registry of the V-groove 8 in the bearing 2 and the knife edge 7 associated therewith. The bearing 2 is rapidly and easily assembled in the spider 1 by sliding the C-clip 17 on at the annular recess 16 of the shank 11 and then manually forcing the shank 11 into the cylindrical portion 12 of the socket 13. The disassembly is accomplished in an equally simple manner by manually pulling the bearing 2 out of the socket 13 and removing the C-clip 17 from the shank 11.

Preferably, the distance between the ends of the C-clip 17 is less than the diameter of the shank 11 at the annular recess 16 so that the clip, when once forced into place will not fall off the shank.

Another bearing retaining means embodying the invention consists of approximately two turns of a tightly-wound helical spring 20 (see Figure VII) the outer dimension of which is an interference fit with a cylindrical portion 12 of the socket 13. As in the case of bearing employed with the first modification, the shank 11 of the bearing (see Figures V and VI) has an annular recess 16, but the annular recess 16 is located near the upper end of the shank 11. The top portion 21 of the shank 11 above the annular recess 16 is reduced in diameter so that there is sufficient space between a top portion 21 of shank 11 and the walls of the cylindrical portion 12 of the socket 13 for the turns of the spring 20 to pass freely. An upper shoulder 18 of the annular recess 16 engages the turns of the spring 20. The insertion of the bearing 2 can be accomplished with rapidity and simplicity equal to that enjoyed when employing the first modification of the retaining means.

The compressive force exerted by the spread turns of the spring 20 may be relied upon to hold the shank 11, instead of engaging the spring in an annular recess. This is shown in Figure VIII, where the bearing 2 is retained by the compressive force between the two turns of the spring 20 exerted on a reduced section 22 of the shank 11. The bearing 2 is allowed practically the same freedom of motion that is permitted in the employment of the first modification since the compression force holding the bearing 2 is negligible in comparison to the forces tending to align the bearing 2 with the knife edge 7.

The term "resilient force" as used herein means a recoiling or rebounding force which is exerted either against the walls of the socket or against the shank of the pivot so as to create a frictional resistance which fulfills the essential requirements of being (1) sufficiently great to support the weight of the attached bearing, and at the same time (2) sufficiently small to allow the bearing to be withdrawn from the socket manually. The embodiments of the invention described hereinbefore, although generally preferred because of their extremely simple and practical nature, are in no way intended to limit the scope of the invention, and it is to be understood that numerous other modifications may be employed in particular cases. For example, a resilient member such as the C-clip 17 or helical spring 20 may be connected to the shank 11 through a hole or by means of notches or hooks, the resilient member itself may consist of other resilient material such as rubber, or the resilient member may be attached to the walls of the socket 13 and retain the shank 11 of the bearing 2 by resilient force in compression.

Various modifications may be made in the details of construction without departing from the spirit and scope of the invention.

Having described the invention, we claim:

1. In a device of the class described, in combination, a spherical seat bearing for receiving a knife edge pivot, said bearing having a shank with an annular recess of substantial breadth, a support containing a socket for loosely receiving the bearing, said socket having an outwardly opening conical portion and a portion of substantially constant cross-sectional shape, and a thin resilient member that is loosely engaged in the recess of the shank as it frictionally engages the portion of said socket having a substantially constant cross-sectional shape for resisting the removal of said bearing from said socket.

2. In a device of the class described, in combination, a spherical seat bearing for receiving a knife edge pivot, said bearing having a peripherally grooved rod-like shank, a support containing a conical socket portion for receiving the bearing and a cylindrical socket portion for loosely receiving said shank, and a thin resilient member loosely mounted in the groove of the shank and movable therealong, said member frictionally engaging the cylindrical socket portion for resisting the removal of said bearing from said socket.

3. In a device of the class described, in combination, a spherical seat bearing for receiving a knife edge pivot, said bearing having a cylindrical shank containing an annular recess, a support containing a socket having a conical portion for receiving the bearing and a cylindrical portion for loosely receiving said shank, and a thin resilient C-clip loosely fitting the annular recess of the bearing shank and exerting resilient force to frictionally engage said cylindrical socket portion for resisting the removal of said bearing from said socket.

NORMAN E. HART.
WILLIAM A. GUSS.

REFERENCES CITED

The following references are of record in the file of this patent:

UNITED STATES PATENTS

| Number | Name | Date |
|---|---|---|
| 1,310,948 | Hapgood | July 22, 1919 |
| 1,470,665 | Chapman | Oct. 16, 1923 |
| 1,785,382 | Hurt | Dec. 16, 1930 |
| 2,062,424 | Mueller | Dec. 1, 1936 |
| 2,251,462 | Mueller | Aug. 5, 1941 |
| 2,322,949 | Lux | June 29, 1943 |
| 2,368,626 | Williams | Feb. 6, 1945 |